US008236450B2

(12) United States Patent
Thomas et al.

(10) Patent No.: US 8,236,450 B2
(45) Date of Patent: Aug. 7, 2012

(54) LITHIUM INSERTION ELECTRODE MATERIALS BASED ON ORTHOSILICATES DERIVATIVES

(75) Inventors: John O. Thomas, Uppsala (SE); Anton Nyten, Uppsala (SE); Michel Armand, Saint-Martin-d'Uriage (FR)

(73) Assignee: Lifesize AB, Uppsala (SE)

( * ) Notice: Subject to any disclaimer, the term of this patent is extended or adjusted under 35 U.S.C. 154(b) by 792 days.

(21) Appl. No.: 12/377,884

(22) PCT Filed: Aug. 17, 2007

(86) PCT No.: PCT/EP2007/007288
§ 371 (c)(1),
(2), (4) Date: Mar. 23, 2009

(87) PCT Pub. No.: WO2008/022750
PCT Pub. Date: Feb. 28, 2008

(65) Prior Publication Data
US 2010/0104943 A1    Apr. 29, 2010

Related U.S. Application Data

(60) Provisional application No. 60/839,026, filed on Aug. 21, 2006.

(51) Int. Cl.
*H01M 10/052* (2010.01)

(52) U.S. Cl. .................................................. 429/231.95
(58) Field of Classification Search ........................ None
See application file for complete search history.

(56) References Cited

U.S. PATENT DOCUMENTS

| | | | |
|---|---|---|---|
| 3,090,094 A | 5/1963 | Schwartzwalder et al. | 25/156 |
| 5,976,454 A | 11/1999 | Sterzel et al. | 419/2 |
| 6,085,015 A | 7/2000 | Armand et al. | 385/140 |
| 6,103,397 A | 8/2000 | Sugimoto et al. | 428/613 |
| 6,664,008 B1 * | 12/2003 | Suzuki et al. | 429/337 |
| 2002/0195591 A1 | 12/2002 | Ravet et al. | 252/500 |
| 2003/0118904 A1 * | 6/2003 | Hosokawa et al. | 429/217 |
| 2004/0140458 A1 * | 7/2004 | Ravet et al. | 252/500 |
| 2005/0003274 A1 * | 1/2005 | Armand et al. | 429/231.95 |

FOREIGN PATENT DOCUMENTS

| | | |
|---|---|---|
| DE | 196 12 985 | 1/1996 |
| DE | 198 10 544 | 11/1998 |
| DE | 199 28 997 | 6/1999 |
| EP | 1 049 182 | 2/2000 |
| EP | 1 134 826 | 9/2001 |
| EP | 1 569 289 | 8/2005 |
| WO | WO03/076109 | 9/2003 |

* cited by examiner

*Primary Examiner* — Patrick Joseph Ryan
*Assistant Examiner* — Wyatt McConnell
(74) *Attorney, Agent, or Firm* — Licata & Tyrrell P.C.

(57) ABSTRACT

A lithium insertion-type positive electrode material based on an orthosilicate structure and electrical generators and variable optical transmission devices of this material are provided.

18 Claims, No Drawings

LITHIUM INSERTION ELECTRODE MATERIALS BASED ON ORTHOSILICATES DERIVATIVES

This patent application is the National Stage of International Application No. PCT/EP2007/007288, filed Aug. 17, 2007, which claims the benefit of priority from U.S. Provisional Application Ser. No. 60/839,026, filed Aug. 21, 2006, teachings of which are herein incorporated by reference in their entirety.

FIELD OF THE INVENTION

The present invention provides an electrode material of an ordered $Li_3PO_4$ structure wherein oxygens form a possibly distorted hexagonal close-packed arrangement and in which all cationic elements are in tetrahedral coordination. Electrical generators and variable optical transmission devices with at least one electrode comprising this material are also provided.

BACKGROUND OF THE INVENTION

Electrode materials with the olivine structure $LiFePO_4$ (triphyllite) and the quasi-isomorphous delithiated material $\square FePO_4$ (wherein $\square$ refers to an Li vacancy; after Li has been removed from $LiFePO_4$, Fe(2+) shifts to Fe(3+) to maintain charge balance) have the advantage of an operating voltage of 3.5 V vs. $Li^+/Li^\circ$, i.e., in the stability window of both liquid and polymer electrolytes but with a flat charge/discharge (lithium intercalation) plateau. The favourable properties of reversibility and appreciably fast kinetics are believed to be associated with the confinement of both Li and Fe at its two oxidation states in an octahedral environment. The manganese derivative $LiMnPO_4$, which is active at 4.2 V vs. $Li^+/Li^\circ$, is even more ideally suited to work with liquid electrolytes. For both the Fe and Mn derivatives, the absence of miscibility at room temperature between the two phases limits considerably the electronic conductivity through small polarons on the transition metal sites.

DETAILED DESCRIPTION OF THE INVENTION

It has now been found that the confinement of the transition metal ions and lithium ions to octahedral sites, as in the olivine structure of $LiMPO_4$ (M=Fe or Mn or their solid solutions), is not a prerequisite to favourable electrode properties.

The present invention provides materials for use in electrodes belonging to the ordered $Li_3PO_4$ structure, as exemplified by $Li_2FeSiO_4$ and $Li_2MnSiO_4$ and their solid solutions, in which the oxygens form a possibly distorted hexagonal close-packed arrangement and in which all cationic elements are in tetrahedral coordination. In addition, the structure of these materials is modified on the anionic or cationic sites or both sites, by aliovalent or isocharge substitutions, to provide better lithium ion diffusitivity and electronic conductivity. For example, these substitutions allow for the coexistence of iron or manganese in two different oxidation states in the same phase, or introduce specific interactions with other elements having redox levels close to those of Fe and Mn (e.g., $Fe^{2+}/Ti^{4+} \Leftrightarrow Fe^{3+}/Ti^{3+}$, $Mn^{2+}/V^{5+} \Leftrightarrow Mn^{3+}/V^{4+}$, etc.), both of which are favourable to electronic conductivity, while disorder on the anionic site provides preferential diffusion sites for $Li^+$. Similarly, partial substitution of silicon by phosphorus, vanadium and/or aluminium, allows control of the lattice parameters, and hence the size of the bottlenecks through which the lithium diffusion takes place. In the case of vanadium, extra redox states are created increasing the electrode capacity. In addition, and in contrast to $LiMPO_4$, where the number of electrons per transition metal ion is limited to one, with the materials of the present invention it is possible to exchange more than one electron per transition metal ion, especially with manganese and vanadium.

Accordingly, the present invention provides lithium insertion-type positive electrode materials based on the orthosilicate structure, whose general formula, Formula I, comprises

$$Li_{x+y}M_{1-(y+d+t+q+r)}D_dT_tQ_qR_r[SiO_4]_{1-(p+s+v+a+b)}[SO_4]_s[PO_4]_p[VO_4]_v[AlO_4]_a[BO_4]_b$$

wherein

M is $Mn^{2+}$ or $Fe^{2+}$ or a mixture thereof;

D is a metal in the +2 oxidation state selected from the group consisting of $Mg^{2+}$, $Ni^{2+}$, $Co^{2+}$, $Zn^{2+}$, $Cu^{2+}$, $Ti^{2+}$ and $Ca^{2+}$;

T is a metal in the +3 oxidation state selected from the group consisting of $Al^{3+}$, $Ti^{3+}$, $Cr^{3+}$, $Fe^{3+}$, $Mn^{3+}$, $Ga^{3+}$, $Zn^{2+}$ and $V^{3+}$;

Q is a metal in the +4 oxidation state selected from the group consisting of $Ti^{4+}$, $Ge^{4+}$, $Sn^{4+}$ and $V^{4+}$; and R is a metal in the +5 oxidation state selected from the group consisting of $V^{5+}$, $Nb^{5+}$ and $Ta^{5+}$.

Further, M, D, T, Q, R are all elements residing in the tetrahedral sites of the Fe ions in $Li_2FeSiO_4$. The stoichiometric coefficients for $V^{5+}$, $Al^{3+}$ and $B^{3+}$, v, a and b respectively, each reside in the tetrahedral Si sites of $Li_2FeSiO_4$. The stoichiometric coefficients x, y, d, t, q, r, p, s, v, a, and b are all between zero (inclusive) and one. Alternatively, $$0 \leq x \leq 2,$$

$$y+d+t+q+r<1,$$

$$p+s+v+a+b<1,$$

and/or $$3+2y+a+b=y+t+2q+3r+2s+p+v$$

where x is the degree of intercalation during operation of the electrode material.

The present invention also provides an electrical generator comprising at least one positive electrode and one negative electrode, wherein the at least one positive electrode comprises a material of Formula I and the at least one negative electrode is a source of lithium ion at a high chemical activity.

Examples of a source of lithium ion for use in the negative electrode of the electrical generator of the present invention include, but are not limited to, metallic lithium, a lithium alloy, a lithium-carbon intercalation compound, a lithium-titanium spinel $Li_{4+z}Ti_5O_{12}$ ($0 \leq z \leq 3$) and its solid solutions with other spinels, a lithium-transition metal mixed nitride, and any mixtures thereof.

The positive electrode of the electrical generator of the present invention may further comprise a conductive additive. An example of a conductive additive for use in the positive electrode of the present invention is carbon.

Alternatively, or in addition, the positive electrode may further comprise an intercalation material with fast diffusion kinetics. Examples of intercalation materials with fast diffusion kinetics for use in the positive electrodes of the present invention include a lamellar dichalcogenide, a vanadium oxide $VO_x$ ($2.1 \leq x \leq 2.5$), a Nasicon-related material such as $Li_3Fe_2(PO4)_3$, and a carbon-coated $LiFe_{1-\alpha}Mn_\alpha PO_4$ with $0 \leq \alpha \leq 1$.

In addition, the positive electrode of an electronic generator of the present invention may further comprise a polymeric binder. Preferably the polymeric binder possesses ionic conductivity. Examples of polymeric binders for use in the present invention include, but are not limited to, a polyester, a methylmethacrylate-based polymer, an acrylonitrile-based polymer, a vinylidene fluoride-based polymer, a homopolymer or copolymer of tetrafluoroethylene and an ethylene-propylene-diene terpolymer. Additional nonlimiting examples of polymeric binder include carboxymethyl-cellulose and polystyrene sulfonic acid, both as its hydrogen, lithium, sodium or potassium salt. In one embodiment, the polymeric binder is a polyether, crosslinked or not, and dissolved in a salt, the cation of which is at least in part $Li^+$. In another embodiment, the polymeric binder is swollen by an aprotic solvent and contains a salt, the cation of which is at least in part $Li^+$. Examples of aprotic solvents for use in this embodiment include, but are not limited to, ethylene carbonate, propylene carbonate, dimethylcarbonate, diethylcarbonate, methyl-ethylcarbonate, γ-butyrolactone, a tetraalkylsufamide, a dialkyether of a mono-, di-, tri-, tetra- or higher oligo-ethylene glycols of molecular weight lower or equal to 2000, and mixtures thereof.

Further provided in the present invention is a variable optical transmission device comprising transparent semi-conductor coated glass or plastic and two electrodes separated by a solid or gel electrolytes, wherein at least one of the electrodes comprises a material of Formula I. In one embodiment, this electrode is obtained by laying a thin film of material of Formula I on a transparent semi-conductor coated glass or plastic by a vacuum deposition technique, sputtering, or from a sol-gel precursor.

What is claimed is:

1. A lithium insertion-type positive electrode material based on the orthosilicate structure comprising a compound according to Formula I:

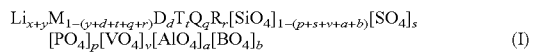

$$\text{Li}_{x+y}\text{M}_{1-(y+d+t+q+r)}\text{D}_d\text{T}_t\text{Q}_q\text{R}_r[\text{SiO}_4]_{1-(p+s+v+a+b)}[\text{SO}_4]_s[\text{PO}_4]_p[\text{VO}_4]_v[\text{AlO}_4]_a[\text{BO}_4]_b \quad \text{(I)}$$

wherein

M is selected from the group consisting of $Mn^{2+}$ and $Fe^{2+}$ and mixtures thereof;

D is a metal in the +2 oxidation state selected from the group consisting of $Mg^{2+}$, $Ni^{2+}$, $Co^{2+}$, $Zn^{2+}$, $Cu^{2+}$, $Ti^{2+}$ and $Ca^{2+}$;

T is a metal in the +3 oxidation state selected from the group consisting of $Al^{3+}$, $Ti^{3+}$, $Cr^{3+}$, $Fe^{3+}$, $Mn^{3+}$, $Ga^{3+}$, $Zn^{2+}$ and $V^{3+}$;

Q is a metal in the +4 oxidation state selected from the group consisting of $Ti^{4+}$, $Ge^{4+}$, $Sn^{4+}$ and $V^{4+}$;

R is a metal in the +5 oxidation state selected from the group consisting of $V^{5+}$, $Nb^{5+}$ and $Ta^{5+}$; and M, D, T, Q, R are elements residing in the tetrahedral sites of the Fe ions in $Li_2FeSiO_4$; and wherein x, y, d, t, q, r, p, s, v, a, b are between 0 and one; or wherein x is between 0 and 2, y+d+t+q+r are less than 1, p+s+v+a+b are less than 1 and 3+2y+a+b=y+t+2q+3r+2s+p+v.

2. An electrical generator comprising at least one positive electrode and one negative electrode wherein the at least one positive electrode comprises the lithium insertion-type positive electrode material of claim 1 and the at least one negative electrode is a source of lithium ion at a high chemical activity.

3. The electrical generator of claim 2 wherein the at least one negative electrode comprises metallic lithium, a lithium alloy, a lithium-carbon intercalation compound, a lithium-titanium spinel $Li_{4+z}Ti_5O_{12}$ ($0 \leq z \leq 3$) and its solid solutions with other spinels, a lithium-transition metal mixed nitride, or a mixture thereof.

4. An electrical generator of claim 2 wherein the at least one positive electrode further comprises a conductive additive.

5. The electrical generator of claim 4 wherein conductive additive comprises carbon.

6. The electrical generator of claim 2 characterized wherein the at least one positive electrode further comprises an intercalation material selected from the group consisting of lamellar dichalcogenide, a vanadium oxide $VO_x$ ($2.1 \leq x \leq 2.5$), a Nasicon-related material and a carbon-coated $LiFe_{1-\alpha}Mn_\alpha PO_4$ with $0 < \alpha < 1$.

7. The electrical generator of claim 6 wherein the Nasicon-related material is $Li_3Fe_2(PO_4)_3$.

8. The electrical generator of claim 2 wherein the at least one positive electrode further comprises a polymeric binder.

9. The electrical generator of claim 8 wherein the polymeric binder comprises a homopolymer or copolymer of tetrafluoroethylene or an ethylene-propylene-diene terpolymer.

10. The electrical generator of claim 8 wherein the polymeric binder possesses ionic conductivity.

11. The electrical generator of claim 6 wherein the at least one positive electrode further comprises a polymeric binder.

12. The electrical generator of claim 11 wherein the polymeric binder is a polyether crosslinked or not and dissolved in a salt, the cation of which is at least in part $Li^+$.

13. The electrical generator of claim 11 wherein the polymeric binder is swollen by an aprotic solvent and contains a salt, the cation of which is at least in part $Li^+$.

14. The electrical generator of claim 8 wherein the polymeric binder is a polyether, a polyester, a methylmethacrylate-based polymer, an acrylonitrile-based polymer, a vinylidene fluoride-based polymer.

15. The electrical generator of claim 11 wherein the polymeric binder is carboxymethyl-cellulose or polystyrene sulfonic acid, both as its hydrogen, lithium, sodium or potassium salt.

16. The electrical generator of claim 13 wherein the aprotic solvent is ethylene carbonate, propylene carbonate, dimethylcarbonate, diethylcarbonate, methyl-ethylcarbonate, γ-butyrolactone, a tetraalkylsufamide, a dialkyether of a mono-, di-, tri-, tetra- or higher oligoethylene glycol of molecular weight lower or equal to 2000, or a mixture thereof.

17. A variable optical transmission device comprising transparent semi-conductor coated glass or plastic and two electrodes separated by a solid or gel electrolytes, wherein at least one of the electrodes comprises the lithium insertion-type positive electrode material of claim 1.

18. The variable optical transmission device of claim 17 wherein the electrode comprising the lithium insertion-type positive electrode material is obtained by laying a thin film of said material on a transparent semi-conductor coated glass or plastic by a vacuum deposition technique, sputtering, or from a sol-gel precursor.

* * * * *

UNITED STATES PATENT AND TRADEMARK OFFICE
CERTIFICATE OF CORRECTION

| | |
|---|---|
| PATENT NO. | : 8,236,450 B2 |
| APPLICATION NO. | : 12/377884 |
| DATED | : August 7, 2012 |
| INVENTOR(S) | : John O. Thomas |

It is certified that error appears in the above-identified patent and that said Letters Patent is hereby corrected as shown below:

In the Specification

In column 2, line 21, please delete "$Zn^{2+}$".
In column 2, line 21, please insert --$Zn^{3+}$--.

In the Claims

In column 3, line 48, please delete "$Zn^{2+}$".
In column 3, line 48, please insert --$Zn^{3+}$--.

Signed and Sealed this
Nineteenth Day of November, 2013

Teresa Stanek Rea
*Deputy Director of the United States Patent and Trademark Office*